(12) United States Patent
Shigeta (10) Patent No.: US 6,577,369 B2
(45) Date of Patent: Jun. 10, 2003

(54) LIQUID CRYSTAL DISPLAY

(75) Inventor: Masanobu Shigeta, Yokosuka (JP)

(73) Assignee: Victor Company of Japan, Ltd. (JP)

( * ) Notice: Subject to any disclaimer, the term of this patent is extended or adjusted under 35 U.S.C. 154(b) by 171 days.

(21) Appl. No.: 09/891,078

(22) Filed: Jun. 25, 2001

(65) Prior Publication Data

US 2002/0008831 A1 Jan. 24, 2002

(30) Foreign Application Priority Data

Jun. 28, 2000 (JP) ......................................... 2000-194141

(51) Int. Cl.[7] ............................................. G02F 1/1343
(52) U.S. Cl. ....................... 349/143; 349/100; 349/147; 349/172
(58) Field of Search ................................ 349/143, 147, 349/148, 100, 172, 174

(56) References Cited

U.S. PATENT DOCUMENTS 4,590,128 A * 5/1986 Kawai ..................... 428/411.1
5,570,213 A   10/1996 Ruiz et al. ................. 359/72
6,459,201 B1 * 10/2002 Schermerhorn et al. ..... 313/586

FOREIGN PATENT DOCUMENTS

JP    09-080379    3/1997    ............ G02F/1/133

* cited by examiner

*Primary Examiner*—Tuan H. Nguyen
*Assistant Examiner*—Thanh Nguyen
(74) *Attorney, Agent, or Firm*—Renner, Kenner, Greive, Bobak, Taylor & Weber (57) ABSTRACT

A liquid crystal display having a transparent electrode layer is free from interference fringes and image sticking are disclosed. The transparent electrode layer may consist of a first transparent film, a transparent electrode film, a second transparent non-conductive film and a transparent conductive film, the films being laminated on a transparent electrode substrate in order in which the transparent conductive film has an extended portion that reaches the transparent electrode film so that the transparent conductive film is electrically coupled to the transparent electrode film via the extended portion. Or, the transparent electrode layer may consist of a first transparent film, a transparent electrode film and a second transparent film, the films being laminated on a transparent electrode substrate in order in which the second transparent film has resistivity low enough to transfer charges to the transparent electrode film.

6 Claims, 5 Drawing Sheets

| | INTERFERENCE FRINGE | IMAGE STICKING |
|---|---|---|
| EMBODIMENT 1 | ○ | ○ |
| EMBODIMENT 2 | ○ | ○ |
| SAMPLE I | ○ | × |
| SAMPLE II | ○ | × |

LIQUID CRYSTAL DISPLAY

BACKGROUND OF THE INVENTION

The present invention relates to a liquid crystal display. Particularly, this invention relates to the structure of a transparent electrode layer formed on a transparent substrate of a liquid crystal display.

Liquid crystal projectors have recently been used, for example, for presentation of new products using images created by computer-graphics and projected onto a screen and in home theater in which moving pictures are projected onto a large screen.

As displaying devices used for liquid crystal projectors, reflective liquid crystal displays have gotten a lot of attention for high intensity and high resolution because of high aperture ratio at high pixel density.

Figure 1:
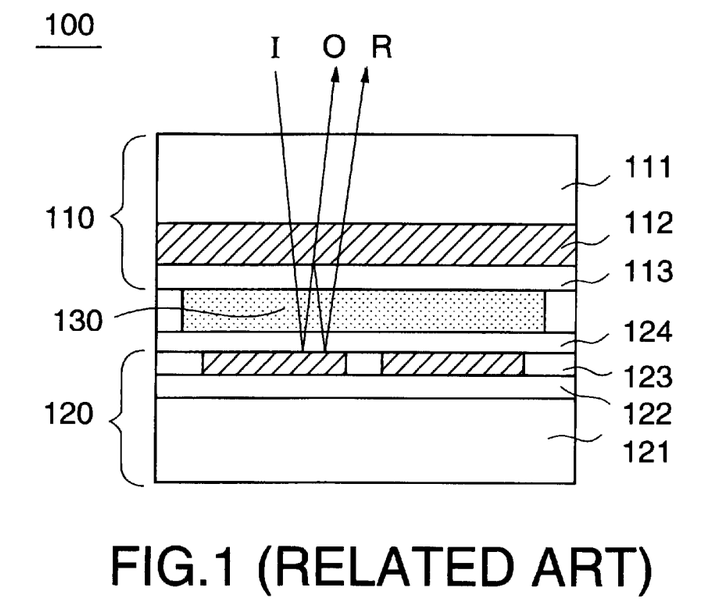
FIG. 1 is a sectional view showing a known liquid crystal display.

FIG. 1 is a sectional view showing a known liquid crystal display.

A liquid crystal display 100 is provided with a transparent electrode substrate 110 and a substrate 120 of integrated circuitry and a liquid crystal layer 130 interposed therebetween. The substrate 120 is called an IC-substrate hereinafter.

The transparent electrode substrate 110 consists of a transparent electrode layer 112 and a first orientation film 113 stacked under a transparent glass substrate 111.

The IC-substrate 120 consists of an active-matrix driver 122, a pixel electrode layer 123 and a second orientation film 124 stacked on a silicon substrate 121.

In operation, a linearly-polarized reading light beam I is incident from the transparent electrode substrate 110 side to reach the pixel electrode layer 123 through the transparent electrode substrate 110 and the liquid crystal layer 130.

A light beam reflected on the pixel electrode layer 123 passes through the liquid crystal layer 130 in the direction reversal of incidence and is emitted from the transparent electrode substrate 110. The emitted reading light beam I is projected onto a screen via a projection lens (both not shown) for displaying an image thereon while it is optically modulated to be a projection beam O in accordance with a video signal in the liquid crystal layer 130.

Liquid crystal projectors are usually provided with a discharge-type light source of high intensity, such as, a metal halide lamp or a ultra high-pressure mercury lamp of high emission efficiency. These lamps contain mercury as an emission triggering gas. They generate strong emission lines of 440, 540 and 580 nm in an emission spectrum for mercury in a visible radiation range.

The transparent electrode layer 112 of the transparent electrode substrate 110 is made of a transparent conductive film such as ITO (Indium Tin Oxide) of high reflectivity.

Thus, there is a big difference in reflectivity at the interfaces between the transparent electrode layer 112 and the liquid crystal layer 130.

This causes reflection, on the interfaces, of some beam components of the light beam which have been reflected on the pixel electrode layer 123. Moreover, interference fringes could occur on a projected image due to interference between emission lines of specific wavelength involved in the projection beam O and a reflected beam R that is the emission line reflected on the interfaces when the reading light beam I carries the strong emission lines described above.

U.S. Pat. No. 5,570,213 discloses a multi-layer anti-reflection film formed on a transparent electrode layer for restricting reflection on the interfaces between the transparent electrode layer and a liquid crystal layer, thus controlling occurrence of interference fringes.

Figure 2:
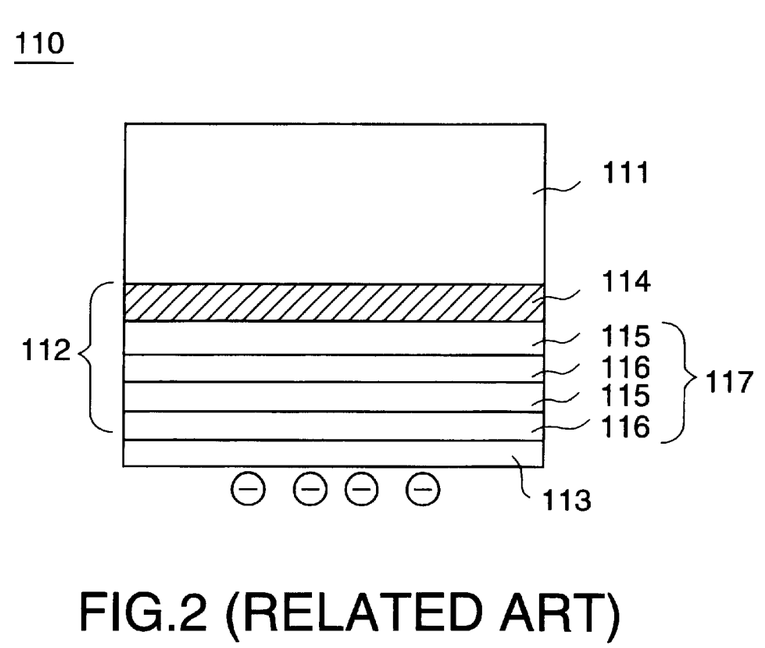
FIG. 2 is a sectional view showing a known transparent electrode substrate.

FIG. 2 is a sectional view showing a transparent electrode substrate disclosed in U.S. Pat. No. 5,570,213.

Elements shown in FIG. 2 that are the same as or analogous to elements in the reflective liquid crystal display in FIG. 1 are referenced by the same reference numbers and will not be explained.

A transparent electrode substrate 110 is provided with a multi-layer anti-reflection film 117 formed on a transparent electrode film 114 on a transparent glass substrate 111. The multi-layer anti-reflection film 117 consists of low-reflectance dielectric films 115 and high-reflectance dielectric films 116, totally four films laminated by turns. A transparent electrode layer 112 consists of the transparent electrode film 114 and the multi-layer anti-reflection film 117.

Optical film thickness of each of the low- and high-reflectance dielectric films 115 and 116 is decided by simulation so that the multi-layer anti-reflection film 117 has an optimum anti-reflecting function against emission lines of specific wavelength among those generated by a light source.

The multi-layer anti-reflection film 117 that consists of the low- and high-reflectance dielectric films 115 and 116 is, however, not a conductive material, and hence the anti-reflection film 117 is charged, at its surface, with ionized impurities, etc., that have been involved in the liquid crystal layer 130 due to d. c. voltage application for driving the liquid crystals.

Charges such as ionized impurities remain on the antireflection film 117 even if the liquid crystal layer 130 is turned off. This causes a situation as if it is still turned on, that is, a still image or a fixed pattern of image generated while the liquid crystals have been driven remains on the layer 130, which is called image sticking.

SUMMARY OF THE INVENTION

A purpose of the present invention is to provide a liquid crystal display of high image quality with restricted interference fringes and no image sticking even if employing a light source of high emission efficiency for generating strong emission lines.

The present invention provides a liquid crystal display including: a first substrate on which a pixel electrode layer is formed; a second transparent electrode substrate on which a transparent electrode layer is formed, the transparent electrode layer having a first transparent film, a transparent electrode film, a second transparent non-conductive film and a transparent conductive film, the films being laminated on the transparent electrode substrate in order; and a liquid crystal layer interposed between the first and the second substrates so that the pixel electrode layer and the transparent conductive film face each others wherein the transparent conductive film has an extended portion that reaches the transparent electrode film so that the transparent conductive film is electrically coupled to the transparent electrode film via the extended portion.

Moreover, the present invention provides a liquid crystal display including: a first substrate on which a pixel electrode layer is formed; a second transparent electrode substrate on which a transparent electrode layer is formed, the transparent electrode layer having a first transparent film, a transparent electrode film and a second transparent film, the films being laminated on the transparent electrode substrate in order; and a liquid crystal layer interposed between the first and the second substrates so that the pixel electrode layer and the second transparent film face each other, wherein the second transparent film has resistivity low enough to transfer charges to the transparent electrode film.

Furthermore, the present invention provides a method of forming a transparent electrode layer on a transparent substrate of a liquid crystal display in which a liquid crystal layer is interposed between the transparent electrode layer and a pixel electrode layer. A first transparent film and a transparent electrode film are formed on the transparent substrate in order by vacuum deposition at respective specific thickness. A specific region of the transparent electrode film is masked with resists. A second transparent non-conductive film is formed on the transparent electrode film having the masked specific region. The resists are removed from the masked specific region. A transparent conductive film is formed on the second transparent non-conductive film and on the resist-removed specific region so that the transparent conductive film reaches the transparent electrode film via the specific region.

Moreover, the present invention provides a method of forming a transparent electrode layer on a transparent substrate of a liquid crystal display. A first transparent film and a transparent electrode film are formed on the transparent substrate in order by vacuum deposition at respective specific thickness. A second transparent film is formed on the transparent electrode film by ion plating at room temperature.

DETAILED DESCRIPTION OF PREFERRED EMBODIMENTS

Preferred embodiments according to the present invention will be disclosed with reference to the attached drawings.

Elements in the embodiments that are the same as or analogous to elements in the known devices shown in FIGS. 1 and 2 are referenced by the same reference numbers and will not be explained in detail.

Figure 3:
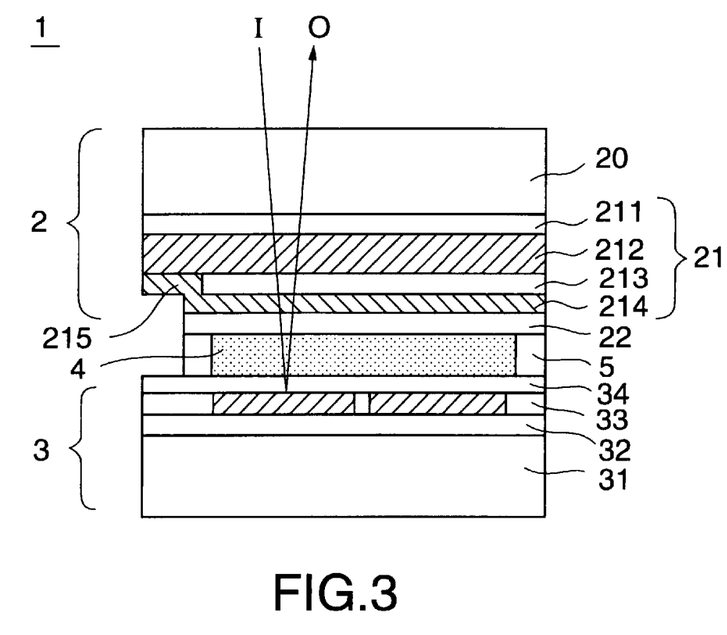
FIG. 3 is a sectional view showing a first preferred embodiment of a liquid crystal display according to the present invention.

As shown in FIG. 3, a first preferred embodiment of a liquid crystal display 1 according to the present invention is provided with a transparent electrode substrate 2 and an IC-substrate 3 facing each other with a liquid crystal layer 4 sealed therebetween by a sealant 5 provided outside the displaying zone.

The transparent electrode substrate 2 has a transparent electrode layer 21 and a first orientation film 22 laminated on the back of a transparent glass substrate 20.

The transparent electrode layer 21 has at least one first transparent film 211, a transparent electrode film 212, at least one second transparent film 213, and a transparent conductive film 214 laminated in this order.

The transparent conductive film 214 is electrically coupled to the transparent electrode film 212 and also a liquid crystal display driver circuitry (not shown) via an electrically coupling portion 215 of the conductive film 214.

The IC-substrate 3 has an active-matrix driver 32, a pixel electrode layer 33 and a second orientation film 34 laminated on a silicon substrate 31 in this order.

The transparent electrode layer 21 of the transparent electrode substrate 2 and the pixel electrode layer 33 of the IC-substrate 3 face each other.

The optical thickness of each of the components of the transparent electrode layer 21, that is, the first transparent film 211, the transparent electrode film 212, the second transparent film 213 and the transparent conductive film 214, is set so as to have a anti-reflection function against emission lines of a specific wavelength $\lambda$ among those generated by a high-intensity discharging-type lump installed in a projector for which the liquid crystal display 1 is used.

In operation, a reading light beam I carrying emission lines of the wavelength $\lambda$ and incident from the transparent electrode substrate 2 side passes the substrate 2 and the liquid crystal layer 4. The reading light beam I is then reflected on the pixel electrode 33 in the direction reversal of incidence and emitted from the transparent electrode substrate 2.

The emission lines of wavelength $\lambda$ reflected by the pixel electrode 33 are not be reflected on the interface between the transparent electrode layer 21 and the first orientation film 22 but pass the layer 21. The emission lines are then emitted from the transparent electrode substrate 2 as a projection beam O.

The projection beam O will not suffer interference fringes 15 because the transparent electrode layer 21 has the anti-reflection function against the emission lines of wavelength $\lambda$.

Figure 4:
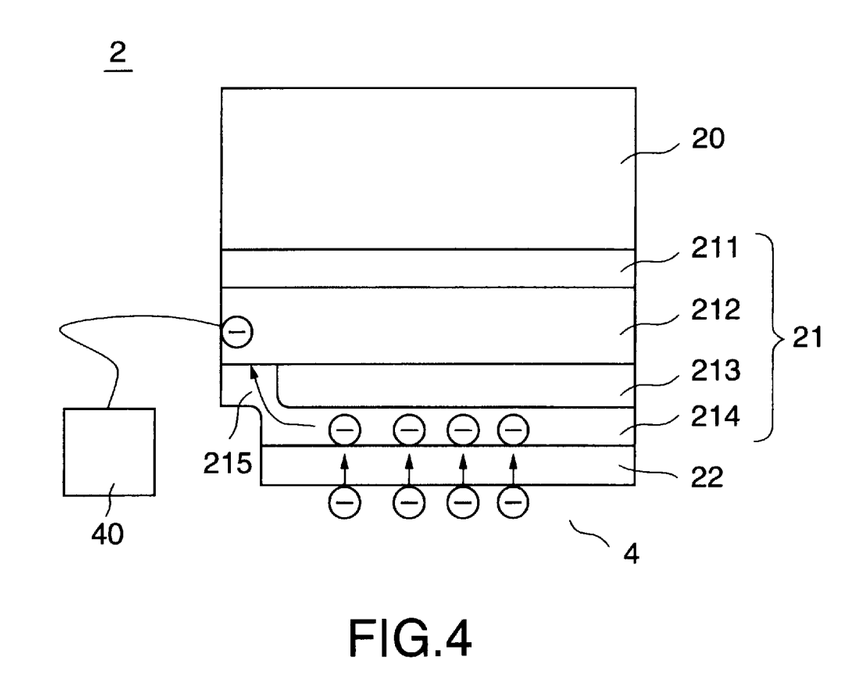
FIG. 4 is an enlarged illustration of a transparent electrode substrate shown in FIG. 3.

Discussed next with reference to FIG. 4 is restriction of image sticking in the first embodiment.

FIG. 4 is an enlarged illustration of the transparent electrode substrate 2.

Provided on the uppermost surface of the transparent electrode layer 21 at the liquid crystal layer 4 side is the transparent conductive film 214 that is coupled to the transparent electrode film 212 and a liquid crystal display driver 40 via the electrically coupling portion 215 of the conductive film 214.

The first orientation film 22 is formed on the transparent electrode layer 21 by angle vapor deposition (or oblique evaporation) so that the film 22 becomes a low-density film for charges to easily pass therethrough. It is known that a low-density film allows charges to pass therethrough.

Charges such as ionized impurities involved in the liquid crystal layer 4 are thus discharged to the liquid crystal display driver 40 via the first orientation film 22, the transparent conductive film 214, the electrically coupling portion 215 of the film 214 and the transparent electrode film 212.

This discharging is conducted even though a d. c. voltage is supplied to the liquid crystal layer 4 for a certain period of time for displaying a still image or a fixed pattern. No charges will be stored on the transparent electrode layer 21, thus image sticking being restricted.

The resistance of the transparent conductive film 214 can be any value as long as it allows discharging, for example, $10^5$ $\Omega/\square$ or less in sheet resistance. Resistance is expressed as sheet resistance for conductive films and resistivity for dielectric films in this invention.

The first transparent film 211 or the second transparent film 213 may be composed of several high- and low-reflectance films laminated by turns. Moreover, transparent conductive films such as ITO as disclosed in U.S. Pat. No. 5,570,213 may be used as the high-reflectance films.

Figure 5:
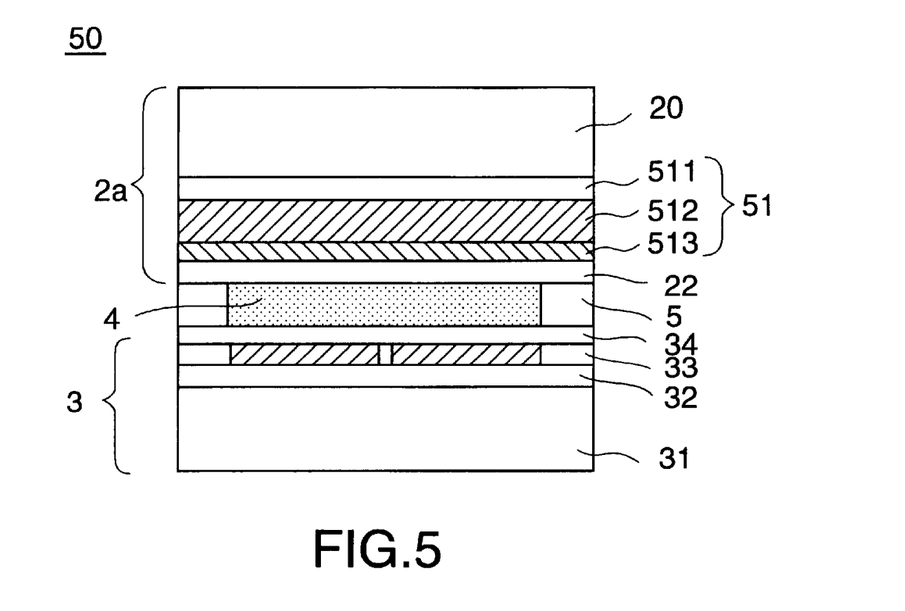
FIG. 5 is a sectional view showing a second preferred embodiment of a liquid crystal display according to the present invention.

Disclosed next with reference to FIG. 5 is a second embodiment of a liquid crystal display according to the present invention.

Elements in the second embodiment that are the same as or analogous to elements in the first embodiment shown in FIG. 3 are referenced by the same reference numbers and will not be explained.

As illustrated in FIG. 5, the difference between the first and the second embodiments is that a liquid crystal display 50 (the second embodiment) is provided with a transparent electrode layer 51 instead of the transparent electrode layer 21 (FIG. 3).

The transparent electrode layer 51 has a first transparent film 511, a transparent electrode film 512 and a second transparent film 513 laminated in this order.

The optical thickness of each of these films is set so as to have an anti-reflection function against emission lines of a specific wavelength λ among those generated by a high-intensity discharging-type lump installed in a projector for which the liquid crystal display 50 is used.

The second transparent film 513 attached to the transparent electrode film 512 has resistivity of $10^{13}$ $\Omega$cm or less.

According to the second embodiment, like the first embodiment, since the transparent electrode layer 51 that consists of the first transparent film 511, the transparent electrode film 512 and the second transparent film 513 has the anti-reflection function against emission lines of wavelength λ, the emission lines will not be reflected on the interfaces between the transparent electrode layer 51 and the liquid crystal layer 4, thus restricting occurrence of interference fringes.

Figure 6:
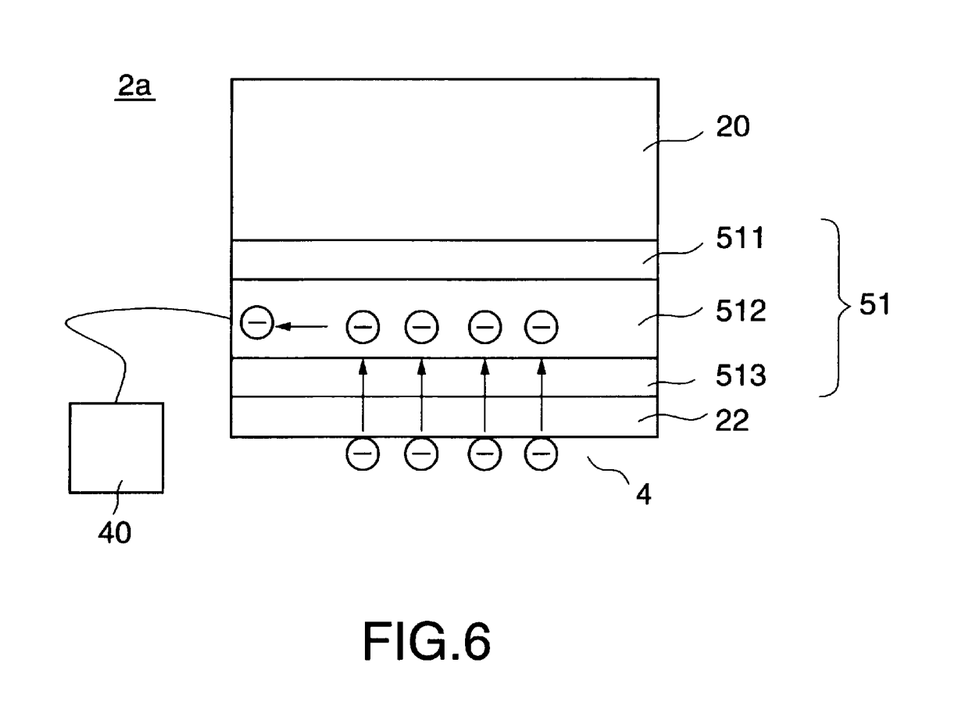
FIG. 6 is an enlarged illustration of a transparent electrode substrate shown in FIG. 5.

Discussed next with reference to FIG. 6 is restriction of image sticking in the second embodiment.

FIG. 6 is an enlarged illustration of a transparent electrode substrate 2a.

Provided on the uppermost surface of the transparent electrode layer 51 at the liquid crystal layer 4 side is the second thin transparent film 513 having a low resistivity for surface contact with the transparent electrode film 512.

Charges such as ionized impurities involved in the liquid crystal layer 4 are thus discharged to the liquid crystal display driver 40 from the transparent electrode film 512 via the first orientation film 22 formed on the transparent electrode layer 51 at liquid crystal layer 4 side and the second transparent film 513 of low resistivity.

This discharging is conducted even though a d. c. voltage is supplied to the liquid crystal layer 4 for a certain period of time for displaying a still image or a fixed pattern. No charges will be stored on the transparent electrode layer 51, thus image sticking being restricted.

The preferred embodiments according to the present invention will be disclosed further in detail.

As already discussed, transparent conductive films such as ITO have high reflectance to increase in beams reflected at the interface between the film and a liquid crystal layer, thus causing interference fringes for degrading image quality.

In order to solve such a problem, the inventor of this invention has conceived the idea of a transparent electrode layer having an anti-reflection function against emission lines of a specific wavelength λ generated by a light source with lamination of high-reflectance transparent conductive films and low-reflectance dielectric films by turns.

Discussed below are the results of experiments on protection against reflection of emission lines of wavelength λ=540 nm.

(First Embodiment)

The first embodiment is provided with a transparent conductive film on top of a transparent electrode layer having anti-reflection and also anti-image-sticking functions.

Such anti-reflection films were designed by simulation.

Figure 7:
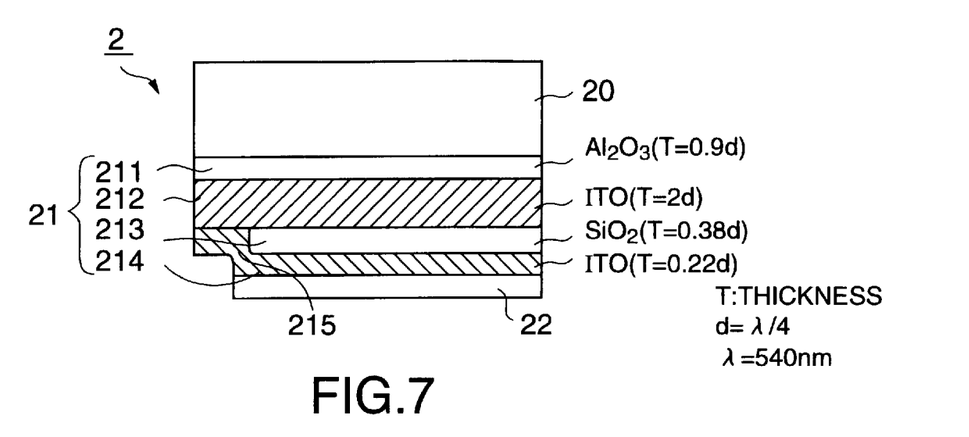
FIG. 7 is an enlarged sectional view showing a transparent electrode substrate having a transparent electrode layer used in the first embodiment.

Selected for the first embodiment among the antireflection films, having the lowest reflectance against emission lines of wavelength λ=540 nm is as follows:

For the first embodiment shown in FIG. 3, $Al_2O_3$ (optical thickness 0.9×d), ITO (optical thickness 2×d), $SiO_2$ (optical thickness 0.38×d), and ITO (optical thickness 0.22×d), where d=λ/4, were selected for the first transparent film 211, the transparent electrode film 212, the second transparent film 213, and the transparent conductive film 214, respectively, as illustrated in FIG. 7.

The uppermost transparent conductive film 214 in this structure of anti-reflection film is thin because its optical thickness is 0.22×d (d=λ/4) having an extremely high sheet resistance of about $10^3$ $\Omega/\square$ to $10^4$ $\Omega/\square$ when an ITO film was formed at low temperature, thus cannot be used as a transparent electrode (having 10 $\Omega/\square$ to 100 $\Omega/\square$ in general) for driving liquid crystals.

Therefore, the transparent conductive film 214 has only an anti-charging function in this embodiment.

However, the second dielectric ($SiO_2$) film 213 provided next to the transparent conductive film 214 is a non-conductive material in the laminated structure. Charges, a cause of image sticking, are thus blocked by the non-conductive second dielectric film 213 so that they are not discharged to the liquid crystal display driver 40 from the transparent electrode film 212.

The inventor of this invention has conceived an idea of the electrically coupling portion 215 extending from the transparent conductive film 214 outside the displaying zone so that the film 214 and the transparent electrode film 212 are electrically coupled via the electrically coupling portion 215.

A method of fabricating the transparent electrode substrate 2 is disclosed.

An $Al_2O_3$ film (the first transparent film 211) and a first ITO film (the transparent electrode film 212) are laminated on the transparent glass substrate 20 in this order by vacuum deposition at respective specific optical thickness.

An $SiO_2$ film (the second non-conductive transparent film 213) is then formed on the first ITO film 212 while a specific region of the first ITO 212 film outside the displaying zone is masked with resists.

The resists are removed and a second ITO film (the transparent conductive film 214) is formed on the $SiO_2$ film 213 so that the second conductive ITO film 214 is formed on the entire surface of the non-conductive $SiO_2$ film 213 and also on the specific region of the first ITO film 212, which was masked with the resists.

The second conductive ITO film 214 portion formed on the specific region of the first ITO film 212 becomes the electrically coupling portion 215.

The transparent electrode layer 21 is thus formed in which the transparent conductive film 214 and the transparent electrode film 212 are then electrically coupled via the electrically coupling portion 215 formed on the specific region of the film 212.

The fabrication of the transparent electrode substrate 2 is finished through the processes described above.

The transparent electrode substrate 2 and the IC-substrate 3 are bonded to each other with a specific gap with sealing the liquid crystal layer 4 therein, thus finishing the liquid crystal display 1 (FIG. 3) of the first embodiment.

(Second Embodiment)

A multi-layer transparent electrode layer was designed by simulation for the second embodiment, having the lowest reflectance against emission lines of wavelength $\lambda$=540 nm.

Figure 8:
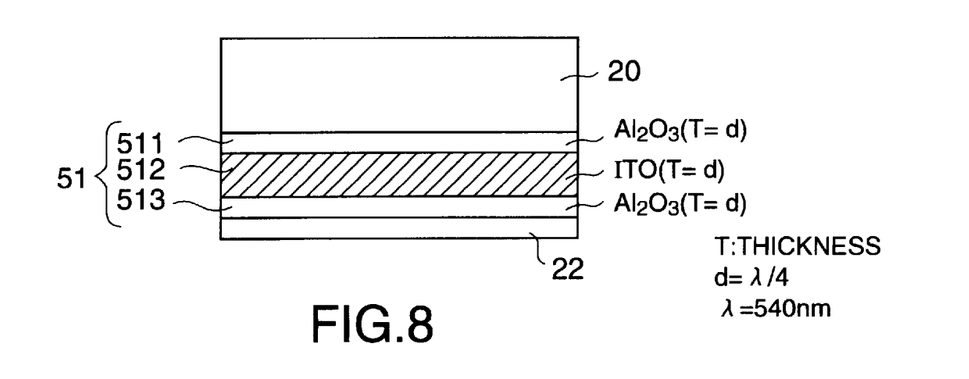
FIG. 8 is an enlarged sectional view showing a transparent electrode substrate having a transparent electrode layer used in the second embodiment.

For the second embodiment shown in FIG. 5, $Al_2O_3$ (optical thickness d), ITO (optical thickness 2×d) and $Al_2O_3$ (optical thickness d) where d=$\lambda$/4, were selected for the first transparent film 511, the transparent electrode film 512 and the second transparent film 513, respectively, as illustrated in FIG. 8.

The resistivity of the $Al_2O_3$ for the second transparent film 513 is about $10^{13}$ $\Omega$cm that is lower than the resistivity $10^{14}$ $\Omega$cm for usual dielectric films.

The transparent electrode layer 51 is fabricated such that an $Al_2O_3$ film (the first transparent film 511) and an ITO film (the transparent electrode film 512) are laminated on the transparent glass substrate 20 in this order by vacuum deposition at respective specific optical thickness, followed by forming an $Al_2O_3$ film (the second transparent film 513) by ion plating at room temperature.

The resistivity of the $Al_2O_3$ films formed as above are $10^{13}$ $\Omega$cm or less that is lower than usual $Al_2O_3$ films.

Sample devices were fabricated as explained below for evaluating the foregoing embodiments.

(Sample I)

Figure 9:
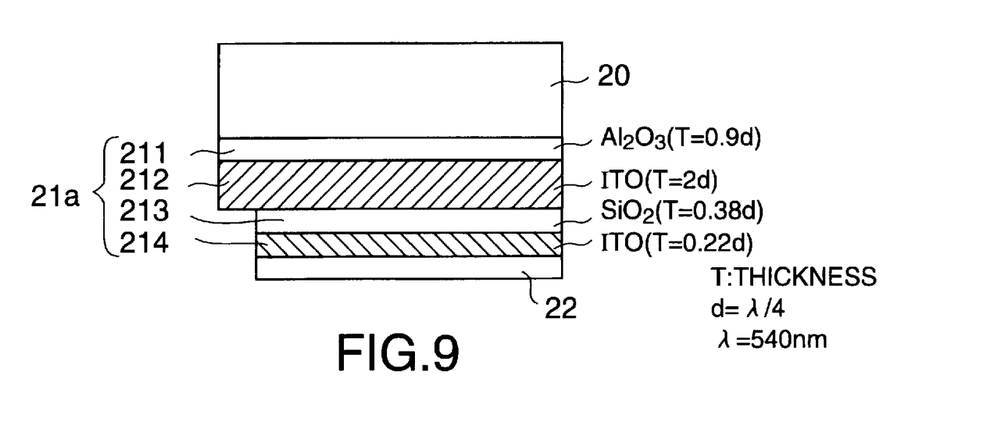
FIG. 9 is an enlarged sectional view showing a transparent electrode substrate having a transparent electrode layer used in the sample device I.

The sample device I illustrated in FIG. 9 has the same structure as the first embodiment shown in FIG. 7 except that a transparent electrode layer 21a of the sample device I does not have such a structure as the first embodiment in that the transparent conductive film 214 and the transparent electrode 212 are electrically coupled via the electrically coupling portion 215 of the film 214.

The transparent electrode substrate 2 having such transparent electrode layer 21a and the IC-substrate 3 were bonded to each other with a specific gap, with sealing the liquid crystal layer 4 therein, thus finishing the sample device I.

(Sample II)

The sample device II has the same structure as the second embodiment shown in FIG. 8 except that an $Al_2O_3$ film as the second transparent film 513 was formed by sputtering instead of ion plating for the second embodiment. The $Al_2O_3$ film (the second transparent film 513) exhibited the resistivity of about $10^{14}$ $\Omega$cm.

The transparent electrode substrate 2a having such transparent electrode layer 51 and the IC-substrate 3 were bonded to each other with a specific gap, with sealing the liquid crystal layer 4 therein, thus finishing the sample device II.

Figure 10:
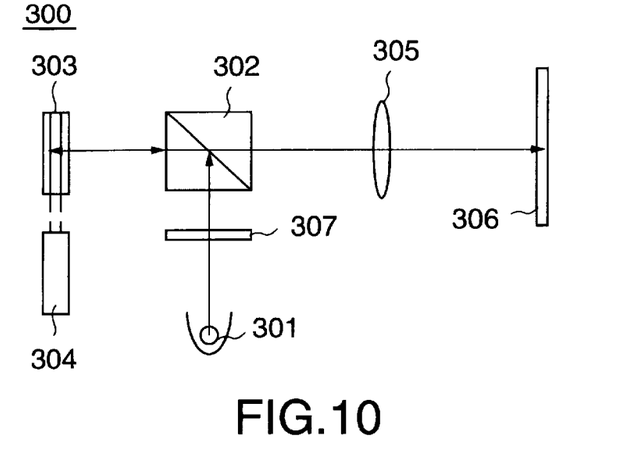
FIG. 10 illustrates a liquid crystal projector used for evaluating the first and the second embodiments.

The liquid crystal displays in the first and the second embodiments and also the sample devices I and II were installed in a projector 300 illustrated in FIG. 10 for examining interference fringes and image sticking.

The projector 300 is equipped with a metal halide lamp 301, a polarization splitter 302, a liquid crystal display 303 and a driver 304 and a projection lens 305.

Images displayed on the displaying zone on the liquid crystal display 303 are projected onto a screen 306 via the projection lens 305.

A filter 307 for allowing green beams of about 50 nm for half bandwidth was situated between the metal halide lamp 301 and the polarization splitter 302 for easy visual inspection of interference fringes against emission lines of wavelength $\lambda$=540 nm.

Moreover, a cross-hatch pattern was displayed on the liquid crystal display 303 and projected onto the screen 306 for 15 minutes. Driving of the display 303 was down to 10% for the entire displaying zone for examining whether there was a remaining cross-hatch pattern.

Figure 11:
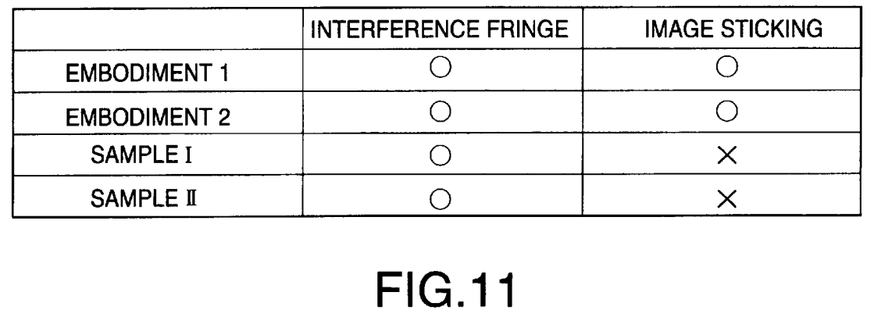
FIG. 11 is a table showing results of experiments on interference fringes and image sticking.

FIG. 11 shows the results of the test for interference fringes and image sticking where the sign "○" indicates no occurrence of interference fringes or image sticking whereas the sign "×" indicates the occurrence of interference fringes or image sticking.

FIG. 11 teaches that the first and the second embodiments are liquid crystal displays excellent on image quality because both of the interference fringes and image sticking did not occur.

Interference fringes did not occur to the sample devices I and II because they were formed with the anti-reflection films the same as the first and the second embodiments.

However, image sticking was occurred to the sample devices I and II because they did not have a discharging function.

Accordingly, the test results teach the advantages of the present invention.

Figure 12:
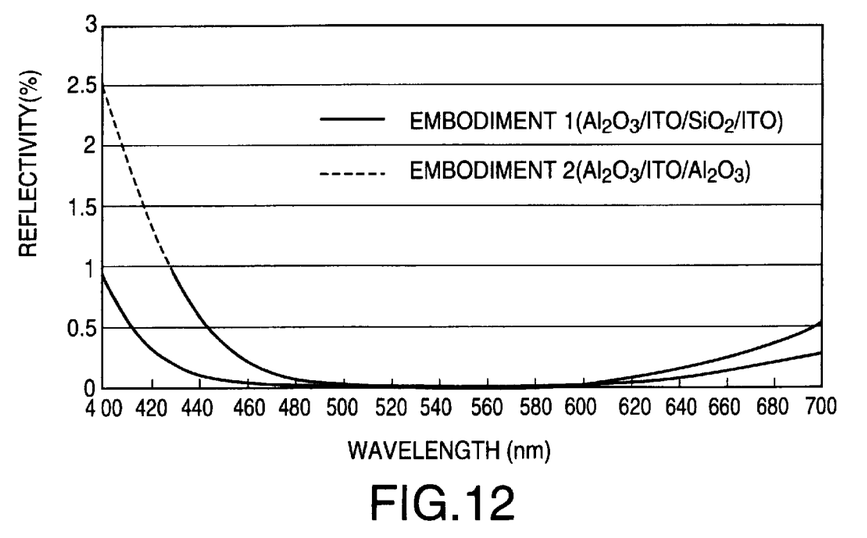
FIG. 12 shows characteristic curves on dependency of reflectivity of transparent electrode layers on wavelength in the first and the second embodiments.

Indicated in FIG. 12 is reflectivity dependency on wavelength for the transparent electrode layers used in the first and the second embodiments.

It is apparent from FIG. 12 that the transparent electrode layers in the first embodiment (solid line curve) and the second embodiment (dot line curve) exhibit 0. 015% and 0. 000%, respectively, of reflectivity against emission lines of wavelength $\lambda$=540 nm.

These curves teach that the first and the second embodiments have an excellent anti-reflection function.

According to the present invention, one type of the transparent electrode layer is made up of the first transparent film, the transparent electrode film, the second transparent non-conductive film and the transparent conductive film laminated in this order.

The transparent conductive film is electrically coupled to the transparent electrode film or the liquid crystal driver via the electrically coupling portion of the transparent conductive film.

The electrically coupling portion restricts ionized impurities, etc., involved in liquid crystals from being charged on the transparent electrode layer, thus images of high quality being displayed with no occurrence of interference fringes and image sticking.

Moreover, according to the present invention, another type of the transparent electrode layer is made up of the first transparent film, the transparent electrode film and the second transparent film laminated in this order.

The second transparent film in this type has the resistivity of $10^{13}$ Ωcm or less, so that charges stored on the transparent electrode layer are easily discharged from the second transparent film to the transparent electrode layer and further to the liquid crystal driver, thus restricting image sticking on the liquid crystals.

It is further understood by those skilled in the art that the foregoing description is the preferred embodiments of the disclosed device and that various changes and modifications may be made, particularly, to the transparent electrode layer, in the invention without departing from the spirit and scope thereof.

What is claimed is:

1. A liquid crystal display comprising:

a first substrate on which a pixel electrode layer is formed;

a second transparent electrode substrate on which a transparent electrode layer is formed, the transparent electrode layer having a first transparent film, a transparent electrode film, a second transparent non-conductive film and a transparent conductive film, the films being laminated on the transparent electrode substrate in order; and a liquid crystal layer interposed between the first and the second substrates so that the pixel electrode layer and the transparent conductive film face each other, wherein the transparent conductive film has an extended portion that reaches the transparent electrode film so that the transparent conductive film is electrically coupled to the transparent electrode film via the extended portion.

2. The liquid crystal display according to claim 1, wherein the transparent conductive film is electrically coupled to an external driver for driving the liquid crystal display via the extended portion.

3. The liquid crystal display according to claim 1, wherein the transparent electrode layer is thick enough to have an anti-reflection function against light of a specific wavelength.

4. The liquid crystal display according to claim 3, wherein the first transparent film, the transparent electrode film the second transparent non-conductive film and the transparent conductive film are (0.9×d), (2×d), (0.38×d) and (0.22×d), respectively, in thickness where d=λ/4, λ being the specific wavelength.

5. A liquid crystal display comprising:

a first substrate on which a pixel electrode layer is formed;

a second transparent electrode substrate on which a transparent electrode layer is formed, the transparent electrode layer having a first transparent film, a transparent electrode film and a second transparent film, the films being laminated on the transparent electrode substrate in order; and a liquid crystal layer interposed between the first and the second substrates so that the pixel electrode layer and the second transparent film face each other, wherein the second transparent film has resistivity low enough to transfer charges to the transparent electrode film.

6. The liquid crystal display according to claim 5, wherein the resistivity of the second transparent film is $10^{13}$ Ωcm or less.

* * * * *